(No Model.)
W. & W. E. FOULKES.
FILTER.
No. 352,644. Patented Nov. 16, 1886.
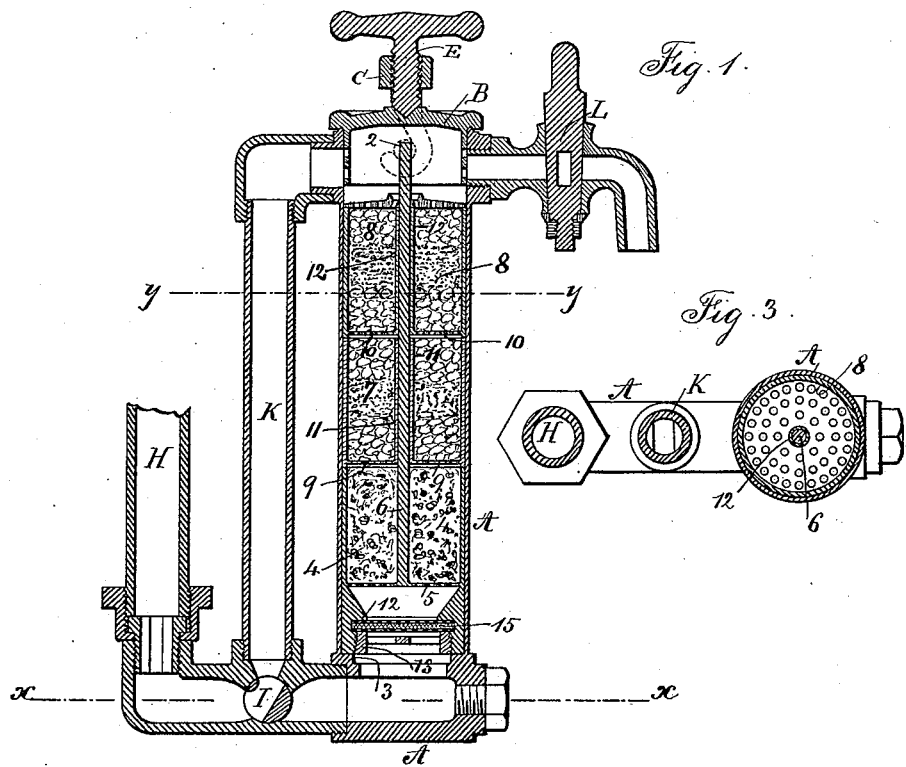
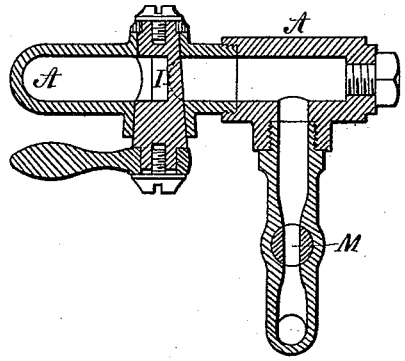
Witnesses:
J. Staib
Chas H Smith
Inventors:
William Foulkes
William Edward Foulkes
per Lemuel W. Serrell Atty

UNITED STATES PATENT OFFICE.

WILLIAM FOULKES AND WILLIAM E. FOULKES, OF MORRISANIA, NEW YORK.

FILTER.

SPECIFICATION forming part of Letters Patent No. 352,644, dated November 16, 1886.

Application filed June 1, 1886. Serial No. 203,721. (No model.)

*To all whom it may concern:*

Be it known that we, WILLIAM FOULKES and WILLIAM EDWARD FOULKES, of Morrisania, in the county and State of New York, have invented an Improvement in Filters, of which the following is a specification.

In our improved filter the filtering materials are placed into movable cylinders within a cylindrical case, the cover of the case being clamped to place to give access to the filtering materials, and there is a supply-pipe to one end of the case and a branch and three-way cock leading to the other end of the case, and discharge-cocks at the upper and lower ends of such case, so that under ordinary circumstances the water will pass to the upper end of the filter-case and down through the filtering material, and will be drawn off from the lower faucet; but when water is to be drawn without filtering the three-way cock will be turned to allow the water to pass directly to the lower discharge-faucet, and when the filtering materials are to be cleansed the water is allowed to pass up through such filtering materials and discharged, with the sediment, from the upper faucet, thus giving great facilities for the introduction of the filtering material, and for the cleansing of the filter whenever necessary.

In the drawings, Figure 1 is a vertical section of the filter complete. Fig. 2 is a sectional plan view at the line *x x*. Fig. 3 is a sectional plan at the line *y y*.

The filter-case A is made with a removable cover, B, that is held in place by the bail C, having hooks at the end that hook beneath the studs 2 at the sides of the case A, and the screw E, that passes through the bail C, clamps the movable cover B firmly to its place, but allows for the easy removal of the same.

Inside the case A is a ledge, 3, upon which rests the cylinder 4, having a perforated septum, 5, from which rises the central rod, 6, and there are two or more removable cylinders, 7 and 8, with perforated bottoms 9 and 10, and guide-tubes 11 and 12, that surround the central rod, 6. Into these cylinders the filtering materials—such as sponge, pulverized rock-crystal, and charcoal—are to be introduced, and there may be disks of felt above the contents of each cylinder, if desired. The guide-tubes 11 and 12 in the respective removable cylinders 7 and 8 not only retain the pulverized filtering material in place, but they allow of the easy removal of the cylinders from the central rod, or the replacing of the same.

Within the cylinder 4, and below the perforated septum 5, is an inward flange, 12, and a screw-ring, 13, by which disks of porous material are clamped against said flange 22. We prefer to use two disks of wire-gauze with felt between them, as shown at 15.

The water to be filtered is supplied by the pipe H, leading to the bottom of the case A, and from this pipe H a vertical branch pipe, K, passes to the top of the case A, and there is a three-way cock, I, at the junction of the pipes H and K, so that the water can be directed either into the bottom or the top of the case A; and there is a discharge cock or faucet, L, at the top of the case A, and another discharge-faucet, M, at the bottom of said case.

Usually the water will pass up the branch pipe K and into the top of the case, and down through the filtering material, and escape by the cock M; but when the three-way cock I is turned to allow the water to pass directly into the bottom part of the filter-case such water may be drawn from the faucet M without going through the filtering material. If, when the three-way cock is in the last-named position, the cock L at the top of the filter-case is opened, the water will pass up through the filtering material, loosening and washing out from the same the accumulations of foreign matter, so as to cleanse such filtering material.

We claim as our invention—

1. The combination, with the filter-case and the supply and discharge pipes at the upper and lower ends thereof, of a removable cap at the upper end, removable cylinders having perforated bottoms and central guide-tubes, and filtering material within said cylinders, and a central rod connected to the lower cylinder and passing up through the guide-tubes, whereby the cylinders and filtering material can be removed for cleaning the filter and the filtering material retained in the respective cylinders, substantially as set forth.

2. The combination, with the filter-case and the supply and discharge pipes at the upper and lower ends thereof, of a removable cap at the upper end, removable cylinders having perforated bottoms and central guide-tubes, and filtering material within said cylinders, and a central rod connected to the lower cylinder and passing up through the guide-tubes, whereby the cylinders and filtering material can be removed for cleaning the filter and the filtering material retained in the respective cylinders, and disks of wire-gauze with intervening felt, and a clamping-ring for clamping the disks in an opening in the base of the lower cylinder, substantially as set forth.

3. The combination, with the vertical filter-case and its removable cap, of the cylinder 4, containing filtering material, the septum 5, and flange 22, formed therewith, the ring 13 at the bottom of the same, and the disks of wire-gauze with intervening felt clamped between the said flange and ring, and the rod 6, for removing the parts from the filter-case, substantially as specified.

Signed by us this 25th day of May, A. D. 1885.

WILLIAM FOULKES.
WM. E. FOULKES.

Witnesses:
GEO. T. PINCKNEY,
WILLIAM G. MOTT.